Jan. 29, 1963 W. P. LEAR, SR 3,075,389
ALTITUDE CONTROLLER
Filed May 1, 1959 3 Sheets-Sheet 1

INVENTOR.
WILLIAM P. LEAR, SR.
BY

ATTORNEY

Jan. 29, 1963  W. P. LEAR, SR  3,075,389
ALTITUDE CONTROLLER

Filed May 1, 1959

INVENTOR.
WILLIAM P. LEAR, SR.
BY

ATTORNEY

Jan. 29, 1963  W. P. LEAR, SR  3,075,389
ALTITUDE CONTROLLER
Filed May 1, 1959
3 Sheets-Sheet 3
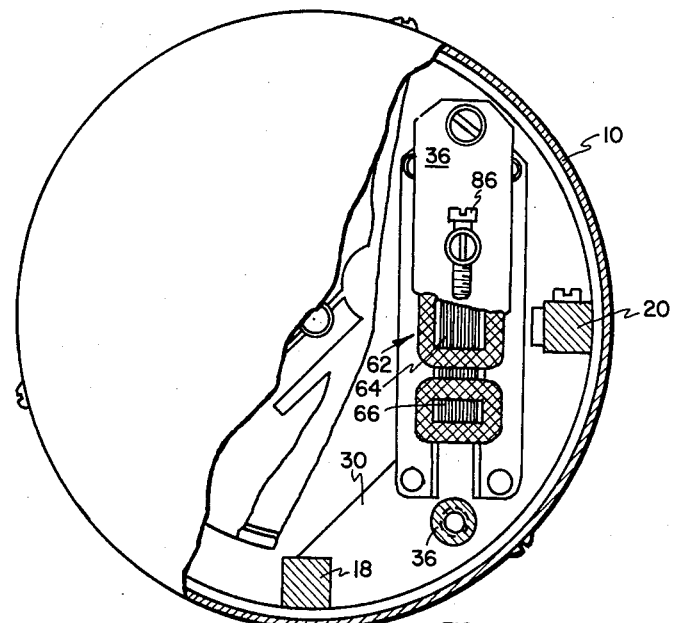
FIG. 4
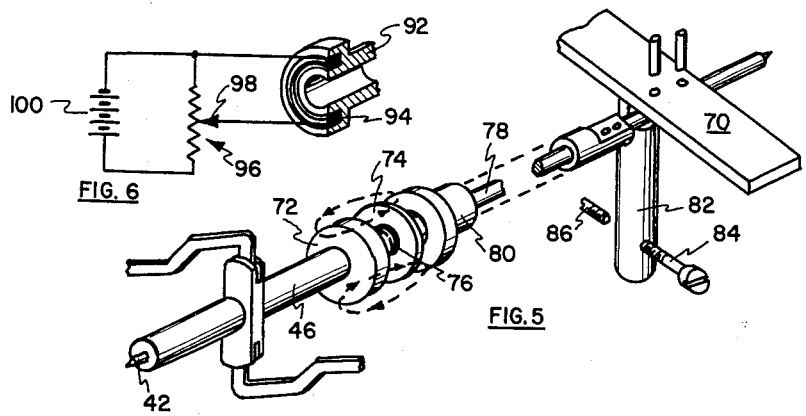
FIG. 6
FIG. 5
INVENTOR.
WILLIAM P. LEAR, SR.
BY
ATTORNEY

United States Patent Office 3,075,389
Patented Jan. 29, 1963

3,075,389
ALTITUDE CONTROLLER
William P. Lear, Sr., Pacific Palisades, Calif., assignor, by mesne assignments, to Motorola, Inc., Chicago, Ill., a corporation of Illinois
Filed May 1, 1959, Ser. No. 810,486
3 Claims. (Cl. 73—386)

This invention relates to a holding controller for aircraft in which a predetermined parameter is automatically held at a specified value.

Controllers of the type to which this invention is directed are well-known in the art and are used for maintaining a predetermined altitude, airspeed or Mach number. In the present application the controller will be illustrated for the case of an altitude controller.

These devices are generally interposed between an altitude measuring device and an automatic altitude control device such as the well-known autopilot which automatically controls the aircraft's control surfaces in response to input error signals. Thus, it is well-known to provide a diaphragm capsule-operated mechanism which positions a shaft as a function of altitude. When the desired altitude is attained by the aircraft, a clutch is engaged to tie the mechanism to a centered electrical pick-off, such as an E type of pick-off or synchro, with the output of the pick-off connected to an automatic altitude control mechanism. If the airplane now goes above or below the altitude at which the automatic controller was connected, appropriate corrective signals are generated, and the aircraft returns to the pre-set altitude.

Other types of systems are well-known, such as a device in which an altitude sensitive mechanism is connected directly to one side of an electrical pick-off. Error signals from the pick-off are fed to a servo system which attempts to drive the other half of the pick-off to a null position. When the desired altitude is reached, the pick-off error signal from the servo amplifier is connected into the autopilot pitch control circuit and the servo motor is stopped. Thus, the servo motor automatically maintains a reference position from which error signals may be measured when the desired altitude is reached.

Still another type of altitude controlling mechanism utilizes pneumatic means where one side of the pressure sensing diaphragm is directly connected to static pressure, while the other side is connected to a reference volume of air which is, in turn, connected through a valve to the static pressure. Once the desired altitude is reached, the valve which normally connects the static and reference volumes of air is closed so that a differential pressure of the proper sense will be developed when the aircraft goes above or below the predetermined altitude. This difference is sensed in the pick-up which generates corrective signals to the autopilot.

In each of the above-noted types of systems, relatively complex mechanisms are required, such as servo mechanisms, complex pneumatic structure and complex clutches. Furthermore, once the preset altitude is set and drives the autopilot it is difficult to override the automatic pilot by manual control. This is because the mechanisms will "give" only prior to that point which would cause prohibitive mechanical stresses in their components.

Furthermore, where there are large altitude changes from the predetermined altitude, large corrective signals are generated which may cause violent changes of the aircraft control surfaces and cause a loss of control of the aircraft.

The principle of this invention is to provide a novel controller device which can be always connected in the automatic pilot circuit and can be easily over-ridden by manual control. Structurally, a pressure-sensing mechanism is connected to an error signal generating structure through a slip clutch having a very light controllable maximum torque. Adjustable stop means are provided on the output side of the clutch which prevent motion of the error signal generating means once the pressure measuring mechanism moves through a predetermined distance. Thus, when the aircraft reaches a predetermined altitude, that altitude will be maintained within limits given by the postion of the stops and the very light torque of the clutch. That is to say, when a reference value is reached and the aircraft altitude increases, the pressure-sensing mechanism will cause motion of the error signal generator means which is transmitted through the clutch. So long as this motion is due to an altitude change within a predetermined range, the error signal generated will cause the automatic pilot to return the aircraft to its predetermined altitude.

However, if the change in altitude is so large that a stop is reached and further motion generates a torque larger than the torque rating of the clutch, the clutch will slip because the stop means is engaged, and there will be no increase in the error signal generated to the autopilot.

In a typical example, mechanical stops are provided on the pick-off error signal generating means at some small increment of altitude such as 50 feet above and below the null position. If the aircraft makes a 50 foot change in altitude, the pick-off will be driven from a null position to a maximum output position as determined by the stop means. After a further change in altitude in the same direction, depending upon the torque transmitting capacity of the clutch, such as 30 feet in this example, the clutch will slip.

In setting the instrument, if the aircraft has been climbing and the pilot switches the pick-off signal to the autopilot when a particular height is reached, a "go-down" signal corresponding to the 50 feet stop setting will be given to the autopilot. As the airplane descends for 30 feet, however, the signal will remain at full "down" value, as the stress in the mechanism working against the friction clutch is relaxed. With the next 50 feet downward the signal will gradually reduce to null after the pick-off leaves the stop position.

Accordingly, if the control is engaged after a climb, the airplane will descend 80 feet and hold altitude, or if in a descent, it will climb 80 feet and hold altitude. In flight this 80 foot change will have the effect of shortening the time for the aircraft to reach its equilibrium or trim altitude.

Accordingly, a primary object of this invention is to provide a novel altitude controller which is simple in construction, highly reliable, has low weight and low cost.

Another object of this invention is to provide a novel controller mechanism which can readily be left in the autopilot circuit at all times, if desired, and can be overridden by manual controls of the aircraft when an altitude change is desired.

Another object of this invention is to provide a novel altitude controller wherein a large change in altitude, due to the autopilot's inability to cope with a condition will cause the controller to seek a new altitude, rather than attempt to return to the old reference within a value determined by stop means plus the torque capacity of a clutch.

Another object of this invention is to provide a novel altitude control mechanism which includes a combined pressure measuring mechanism which is connected to an electrical signal generating mechanism through a clutch having an extremely light controllable torque capacity.

As seen above, one of the more important elements of the structure involves a light, easily controllable torque capacity clutch. It has been found that such a low friction clutch can be obtained by positioning a permanent magnet in spaced relation with respect to a magnetic structure so that the magnetic structure is biased towards engagement with a torque transmitting member. Thus, a first shaft carrying the first torque transmitting member may be positioned to be engaged by a second shaft carrying the magnetic member. The position of the permanent magnet or the position of either of the cooperating clutch members may then be controlled so that the permanent magnet will drive the magnetic member into engagement with the friction member in a controllable manner.

This structure leads to a highly accurate low torque capacity clutch system which is of extreme simplicity and low weight.

Accordingly, a further object of this invention is to provide a novel low torque capacity, low weight clutch.

Another object of this invention is to provide a novel low torque capacity clutch in which the clutch elements are biased towards one another by a permanent magnet.

These and other objects of this invention will become apparent from the following description when taken in connection with the drawings, in which:

FIG. 4 is a partial side cross-sectional view of FIG. 1, taken across the lines 4—4;

FIG. 5 is an exploded perspective view and shows the manner in which the shaft of the controller of FIGS. 1 and 2 carries a load torque capacity clutch and the I of an E–I pick-off element; and FIG. 6 is a perspective view showing an alternate type sleeve and electromagnetic means for the clutch arrangement shown in FIG. 5.

Figure 1:
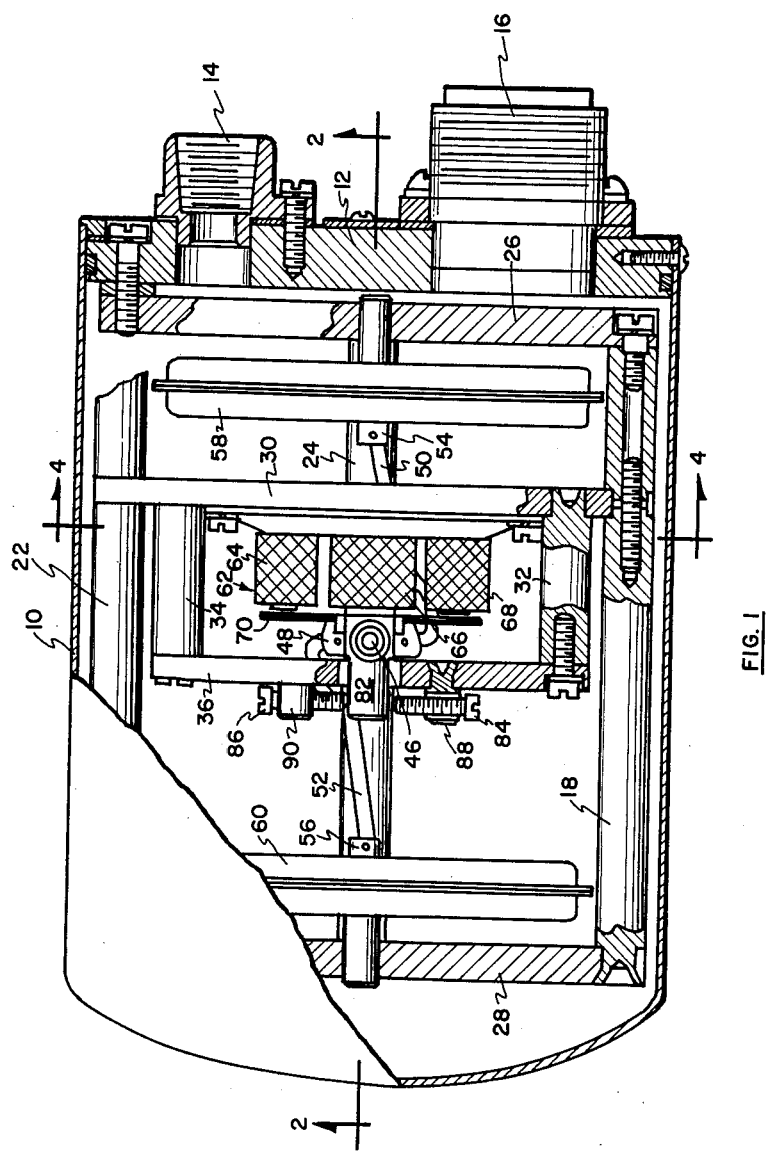
FIG. 1 is a side cross-sectional view of the controller of this invention shown as an altimeter in conjunction with its housing.

Referring first to FIG. 1, the controller is generally contained within a container 10 having a base portion 12 which contains outlets 14 and 16 for supplying pneumatic and electrical connections to the instrument.

Figure 2:
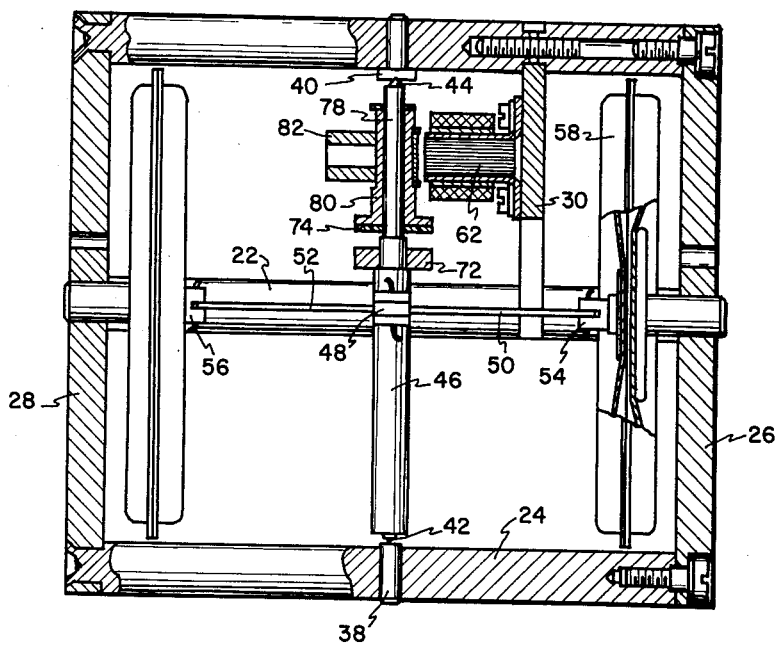
FIG. 2 is a cross-sectional view of FIG. 1, taken across the lines 2—2 with the housing removed.

The instrument is generally supported on four posts 18, 20, 22 and 24. The posts 18, 20, 22 and 24 are generally supported on platforms 26 and 28 which receive the posts in the screw type engagement, as best seen in FIG. 2. The posts further act as supports for receiving intermediate platform 30, as seen in FIGS. 1, 2 and 4, where platform 30 has a general crescent shape with the two extremities and a central portion being received by a necked-down portion of shafts 18, 20 and 22, respectively.

Platform 30, as will be seen more fully hereinafter, operates to support the electrical pick-off structure and has support legs 32 and 34 projecting therefrom, as seen in FIGS. 1 and 4, which support a second platform 36 at their upper end, which carries the stop members to be described hereinafter.

Each of posts 20 and 24 carries pivotal shaft mounting members 38 and 40 which receive the protruding portions 42 and 44, respectively, of shaft 46. Thus, shaft 46 is pivotally mounted in a substantially frictionless manner, as is well known in the art, through the use of a bearing type engagement between members 44 and 40 and members 42 and 38.

Figure 3:
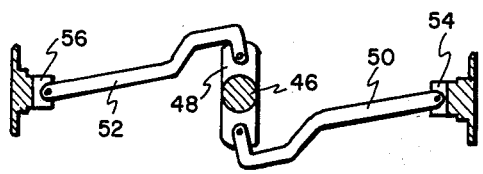
FIG. 3 is a partial side cross-sectional view of the manner in which the pressure sensing elements drive the shaft of the device of FIGS. 1 and 2.

A central portion of shaft 46 has an extending crank arm 48, as seen in FIGS. 1 and 3, where crank arm 48 receives a first link 50 at its lower end with respect to FIG. 1, and a second link 52 at its upper end. Links 50 and 52 have their other ends connected to boss structures 54 and 56, respectively, of diaphragms 58 and 60, respectively, as seen in FIGS. 1 and 2. Accordingly, when the diaphragms 58 and 60, which may be evacuated, are exposed to changes in pressure due to changes in altitude, they will expand or contract so as to cause rotation of crank arm 48, and thus a rotation of shaft 46 which is rigidly secured to crank arm 48.

As stated above, platform 30 carries the pick-off structure to be utilized in accordance with this invention. For illustrative purposes, the pick off structure is shown herein to comprise an E–I type of structure. Thus, platform 30 carries the E portion 62 of the pick-off structure. This E portion is comprised of a laminated magnetic structure having a general E shape formed by three projecting legs with a common end yoke. Each leg of the E structure is provided with a winding seen as windings 64, 66 and 68, respectively, in FIGS. 1 and 4. The I portion of the structure 70, best seen in FIGS. 1 and 2, is positioned to span each of the three legs of the E member.

Generally, in this kind of structure, the center coil 66 is provided with some fixed energization. If the I structure 70 is physically rotated so that it moves closer to the upper leg and further from the lower leg, it is clear that the magnetic flux balance in the structure will be upset so that a larger voltage will be induced in coil 64 than in coil 68, since the air gap in the magnetic circuit including coil 64 is smaller. When the I piece 70 is equidistant from each of the legs, the induced voltage in coils 64 and 68 will be substantially identical so that appropriate circuitry will make this a null point. If the I piece 70 now rotates in the opposite direction so as to be closer to the leg carrying coil 68 than the leg carrying coil 64, then a higher voltage will be induced in coil 68 than in coil 64.

Using these general principles, it is clear that electrical circuitry may easily be provided wherein a clockwise rotation of I member 70 of FIG. 1 may be converted into a positive electrical signal with respect to some null point in which the I piece is equidistant from each of the legs, while a counterclockwise rotation of I piece 70 may be converted into a negative signal with respect to the null position.

The manner in which I piece 70 is driven by shaft 46 is best understood from FIGS. 1, 2 and 5 which show the specific structure of the shaft. Referring to these figures, it is seen that the lower portion of shaft 46 with respect to FIG. 2 carries a permanent magnet member 72 in such a manner that the magnet 72 rotates with shaft 46. This rigid securing may be accomplished in any desired manner.

A friction washer 74 is positioned in spaced relation with respect to magnet 72, the washer 74 being of any desired material having some predetermined coefficient of friction. If desired, the washer 74 may be threadably secured on shaft 46, as indicated by threads 76 of FIG. 5, so that the position of washer 74 with respect to permanent magnet 72 is adjustable.

The shaft 46 then continues in a necked-down portion 78 which extends through a magnetic sleeve 80 having an internal diameter greater than the external diameter of shaft section 78 whereby the magnetic sleeve 80 is capable of rotational movement with respect to shaft portion 78. The upper end of sleeve 80 has a flattened portion, as best seen in FIG. 5, with this flattened portion rigidly receiving I piece 70 in any desired manner so that I piece 70 rotates with the sleeve 80. I piece 70 further has a section 82 protruding therefrom and of any desired material which cooperate with a stop means.

The stop means or stop members are formed by screws 84 and 86 which, as seen in FIG. 1, are carried by threaded brackets 88 and 90, respectively, which are carried by platform 36. As shown in FIGS. 1 and 4, screw 86 and, in a similar manner screw 88 (not seen in FIG. 4), are positioned to permit only a predetermined motion of extension 82 about its pivot, which is the axis of shaft 46.

In operation, permanent magnet 72 exerts a predetermined downward force on magnetic sleeve 80 so as to drive the face of magnetic sleeve 80 into engagement with the adjacent face of washer 74. This provides a highly controlled low torque capacity clutching means for transmitting torque from shaft 46 to the sleeve 80.

If the torque is to be increased, this is easily accomplished by bringing washer 74 closer to the permanent magnet 72 and, conversely, the torque may be decreased by moving the two members further apart.

FIG. 6 shows an alternate method of varying the torque required to make the clutch members slip. The modified sleeve 92 may be used in place of the sleeve 80, provided the member 72 is not a permanent magnet but is constructed of magnetic material. A coil 94 is located in the recessed area of the sleeve 92. A variable resistor 96 has its wiper arm 98 connected to the first end of coil 94. A battery 100 is electrically connected to the resistor 96 and also to the second end of coil 94. The amount of flux in sleeve 94 is a function of the position of wiper arm 98; therefore the torque required to make the clutch members slip is determined by the position of the wiper arm 98. The variable resistor may be located on the outside of the housing for ease of adjustment.

Assuming that a predetermined altitude is to be attained by the aircraft containing the controller of the figures, the combined output of coils 64 and 68 is taken to the pitch control of the autopilot. By way of example, the output of each coil may be rectified and then connected in series opposition with respect to one another.

When the pilot manually causes the aircraft to rise the diaphragms 58 and 60 expand to rotate shaft 48 in a clockwise direction with respect to FIG. 1 so that the upper portion of I piece 70 comes closer to the leg carrying coil 64 than the leg carrying coil 68.

As the aircraft continues to rise, the shaft 46 rotates to a maximum position as determined by stop 86 which receives extension 82 of sleeve 80. Thus, the I piece 70 can no longer rotate. However, the continued expansion of diaphragms 58 and 60 will soon impart a sufficient torque to shaft 46 so that the frictional engagement between washer 74 and magnetic sleeve 80 is overcome, whereby the shaft 46 begins to rotate independently of sleeve 80 with the clutch members slipping.

Accordingly, some positive voltage of a predetermined maximum magnitude is induced from the input coil 66 to coil 64, while a relatively lower voltage is induced in coil 68. The difference in these two voltages is some positive voltage which is the output error signal of the system. This error signal is a relatively small one and may be easily over-ridden by the pilot from the manual aircraft controls.

Note that while the clutch slippage occurs, a new level is constantly assumed by the altitude controller. That is to say, if the climb is stopped by the pilot at some height slightly greater than the height he wishes to maintain, the maximum signal generated by the E-I pick-off will cause the aircraft to begin to descend. This descent will be under the influence of the maximum signal until the torque capacity of the clutch formed by the permanent magnet 72, washer 74 and sleeve 80 is attained, at which time slippage stops and actual rotation of shaft 46 begins. Thus, I piece 70 begins to move to its equilibrium position, whereupon it is positioned equidistant from each of the legs containing coils 64 and 68, respectively, and there is a zero output signal.

From the foregoing description, it will now be realized that the use of a low torque capacity clutch in combination with the pick-off and pressure sensing mechanism leads to an extremely simple, reliable instrument having low weight and high economy.

Since the pilot can readily take over control, even though the altitude controller remains in the autopilot circuit, the controller can readily be left in the autopilot circuit at all times with the pilot overcoming its signal either by force, if desired, or by supplying a biasing signal to the pitch servo of the autopilot when an altitude change is desired.

Furthermore, since only a predetermined maximum signal can be generated by the pick-off, a large change in altitude which cannot be handled by the autopilot will not cause excessively large return signals to the autopilot which could result in a loss of control of the aircraft.

It is to be particularly noted that the device of the present invention requires a clutch having substantially no friction during normal controlling operation, and a small controlled friction during relatively large changes, so that a new reference level may be easily set.

The permanent magnet arrangement for generating the clutch force is ideally suited for this purpose in combination with the stop structure, and before the stops are reached, the only friction of the system is that at the bearing surfaces supporting the shaft.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A controller; said controller comprising a pressure measuring mechanism for converting pressure change into an output mechanical motion, a transducer means for converting mechanical motion into an electrical signal and a clutch; said clutch having an input member and an output member connected to one another through a clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure sensing mechanism; a pressure change beyond some predetermined value causing the application of a torque beyond said predetermined torque capacity of said clutch to be reached whereby said input member of said clutch continues to rotate independently of said output member and said transducer; said clutch medium including a permanent magnet, a friction member carried by one of said input or output members and a magnetic member carried by the other of said input or output members; said permanent magnet being positioned with respect to said magnetic member to drive said magnetic member into engagement with said friction member to hold said members in engagement with a relatively low, closely controlled torque.

2. A controller; said controller comprising a pressure measuring mechanism for converting pressure change into an output mechanical motion, a transducer means for converting mechanical motion into an electrical signal and a clutch; said clutch having an input member and an output member connected to one another through a clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure sensing mechanism; a pressure change beyond some predetermined value causing the application of a torque beyond said predetermined torque capacity of said clutch to be reached whereby said input member of said clutch continues to rotate independently of said output member and said transducer; the initial position of said input member setting a reference point from which output signals of said transducer are measured; said rotation of said input member independently of said output member adjusting said reference point to a new value; said clutch medium including a permanent magnet, a friction member carried by one of said input or output members and a magnetic member carried by the other of said input or output members; said permanent magnet being positioned with respect to said magnetic member to drive said magnetic member into engagement with said friction member to hold said members in engagement with a relatively low, closely controlled torque.

3. A controller; said controller comprising a pressure measuring mechanism for converting pressure change into an output mechanical motion, a transducer means for converting mechanical motion into an electrical signal and a clutch; said clutch having an input member and an output member connected to one another through a clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure sensing mechanism; a pressure change beyond some predetermined value causing the application of a torque beyond said predetermined torque capacity of said clutch to be reached whereby said input member of said clutch continues to rotate independently of said output member and said transducer; said transducer means comprising an E-I pick-off means, the I member of said E-I pick-off means being operatively connected to said output member and being movable with respect to the E member of said E-I pick-off means responsive to movement of said output member; said stop means being positioned to limit the motion of said I member to some predetermined range; said clutch medium including a permanent magnet, a friction member carried by one of said input or output members and a magnetic member carried by the other of said input or output members; said permanent magnet being positioned with respect to said magnetic member to drive said magnetic member into engagement with said friction member to hold said members in engagement with a relatively low, closely controlled torque.

References Cited in the file of this patent
UNITED STATES PATENTS

| | | |
|---|---|---|
| 2,678,178 | MacCallum | May 11, 1954 |
| 2,680,580 | Rossire | June 8, 1954 |
| 2,729,780 | Miller et al. | Jan. 3, 1956 |
| 2,748,217 | Melchior | May 29, 1956 |
| 2,748,355 | Jarvis | May 29, 1956 |
| 2,764,894 | Faxen | Oct. 2, 1956 |
| 2,948,887 | Mounteer et al. | Aug. 9, 1960 |